(12) United States Patent
Sjödin et al.

(10) Patent No.: US 10,576,587 B2
(45) Date of Patent: Mar. 3, 2020

(54) BRAZING CONCEPT

(71) Applicant: ALFA LAVAL CORPORATE AB, Lund (SE)

(72) Inventors: Per Sjödin, Lund (SE); Kristian Walter, Genarp (SE); Fredrik Falkenberg, Stockholm (SE)

(73) Assignee: ALFA LAVAL CORPORATE AB, Lund (SE)

( * ) Notice: Subject to any disclaimer, the term of this patent is extended or adjusted under 35 U.S.C. 154(b) by 670 days.

(21) Appl. No.: 14/909,876

(22) PCT Filed: Sep. 11, 2014

(86) PCT No.: PCT/EP2014/069421
§ 371 (c)(1),
(2) Date: Feb. 3, 2016

(87) PCT Pub. No.: WO2015/043977
PCT Pub. Date: Apr. 2, 2015

(65) Prior Publication Data
US 2016/0175990 A1  Jun. 23, 2016

(30) Foreign Application Priority Data

Sep. 26, 2013 (EP) .................................... 13186207

(51) Int. Cl.
*B23K 35/02* (2006.01)
*B23K 35/365* (2006.01)
(Continued)

(52) U.S. Cl.
CPC ........ *B23K 35/0233* (2013.01); *B23K 1/0006* (2013.01); *B23K 1/19* (2013.01);
(Continued)

(58) Field of Classification Search
None
See application file for complete search history.

(56) References Cited

U.S. PATENT DOCUMENTS 2,289,365 A  7/1942  Jerabek
2,802,750 A *  8/1957  Veale ...................... C04B 33/13
501/123

(Continued)

FOREIGN PATENT DOCUMENTS

CN  2566214 Y  8/2003
CN  1478008 A  2/2004
(Continued)

OTHER PUBLICATIONS

Machine translation JP 2005-088062 (Year: 2005).*
(Continued)

*Primary Examiner* — Alexander F Ferre
(74) *Attorney, Agent, or Firm* — Birch, Stewart, Kolasch & Birch, LLP

(57) ABSTRACT

The present invention relates to a blend of at least one phosphorous source and at least one silicon source, wherein silicon and phosphorous together are present in the blend in at least 25 wt %, and wherein the blend is a mechanical blend of powders, wherein each particle in the blend is either a phosphorous source particle or a silicon source particle. The present invention relates further to a composition comprising the blend a substrate applied with the blend, a method for providing a brazed product, and uses.

18 Claims, 5 Drawing Sheets

(51) Int. Cl.
  *B23K 35/24* (2006.01)
  *B23K 1/00* (2006.01)
  *B23K 35/30* (2006.01)
  *B23K 1/19* (2006.01)
  *C22C 1/04* (2006.01)
  *C22C 33/02* (2006.01)
  *C22C 32/00* (2006.01)

(52) U.S. Cl.
  CPC ........ *B23K 35/025* (2013.01); *B23K 35/0222* (2013.01); *B23K 35/0238* (2013.01); *B23K 35/0244* (2013.01); *B23K 35/24* (2013.01); *B23K 35/30* (2013.01); *B23K 35/302* (2013.01); *B23K 35/3033* (2013.01); *B23K 35/3046* (2013.01); *B23K 35/3053* (2013.01); *B23K 35/365* (2013.01); *C22C 1/0433* (2013.01); *C22C 32/00* (2013.01); *C22C 33/0285* (2013.01)

(56) References Cited

U.S. PATENT DOCUMENTS

| | | | |
|---|---|---|---|
| 4,135,656 | A | 1/1979 | Stern |
| 4,143,258 | A | 3/1979 | McCann et al. |
| 4,313,661 | A | 2/1982 | Yamamichi |
| 6,257,882 | B1 * | 7/2001 | Wyllie, II ............... A61C 7/14 433/2 |
| 6,264,761 | B1 | 7/2001 | Hasegawa et al. |
| 6,394,179 | B1 | 5/2002 | Blomgren et al. |
| 7,326,892 | B1 * | 2/2008 | Cretegny ............... B23K 1/005 219/615 |
| 8,042,726 | B2 | 10/2011 | Herber et al. |
| 8,857,699 | B2 | 10/2014 | Sjodin et al. |
| 2004/0056074 | A1 | 3/2004 | Sjodin |
| 2004/0072013 | A1 | 4/2004 | Tada |
| 2004/0184945 | A1 | 9/2004 | Sjodin |
| 2005/0211017 | A1 * | 9/2005 | Singh Gaur ......... B23K 35/025 75/255 |
| 2006/0060296 | A1 | 3/2006 | Sigler et al. |
| 2007/0164088 | A1 | 7/2007 | Dianatkhah |
| 2008/0006676 | A1 | 1/2008 | Rangaswamy et al. |
| 2008/0127494 | A1 | 6/2008 | Rassmus et al. |
| 2009/0202858 | A1 | 8/2009 | Herber et al. |
| 2009/0305078 | A1 * | 12/2009 | Sjodin ............... B23K 35/3053 428/656 |
| 2010/0215983 | A1 * | 8/2010 | Patel ........................ B22F 7/04 428/679 |
| 2012/0183807 | A1 | 7/2012 | Persson |
| 2013/0084467 | A1 | 4/2013 | Sjödin |
| 2015/0097023 | A1 | 4/2015 | Clement |

FOREIGN PATENT DOCUMENTS

| | | |
|---|---|---|
| CN | 1514758 A | 7/2004 |
| CN | 101100023 A | 1/2008 |
| CN | 101184578 A | 5/2008 |
| CN | 201322570 Y | 10/2009 |
| CN | 102308177 A | 1/2012 |
| CN | 101588890 B | 3/2012 |
| CN | 1474732 B | 4/2012 |
| CN | 102574249 A | 7/2012 |
| EP | 0 508 439 A2 | 10/1992 |
| EP | 0 668 806 B1 | 8/1998 |
| EP | 2 644 312 A1 | 10/2013 |
| FR | 2987570 A1 | 9/2013 |
| GB | 1 256 147 | 12/1971 |
| JP | 8-271175 A | 10/1996 |
| JP | 10-29075 A | 2/1998 |
| JP | 11-287576 A | 10/1999 |
| JP | 2002-539407 A | 11/2002 |
| JP | 2003-48076 A | 2/2003 |
| JP | 2004-529775 A | 9/2004 |
| JP | 2005-940 A | 1/2005 |
| JP | 2005-88062 A | 4/2005 |
| JP | 2010-510067 A | 4/2010 |
| KR | 10-2008-0015871 A | 2/2008 |
| KR | 10-2009-0084942 A | 8/2009 |
| RU | 2 096 150 C1 | 11/1997 |
| RU | 2 167 751 C2 | 5/2001 |
| SE | 416 898 B | 2/1981 |
| SU | 659326 A | 4/1979 |
| TW | M298107 U | 9/2006 |
| TW | 200829358 A | 7/2008 |
| WO | WO 96/37335 A1 | 11/1996 |
| WO | WO 97/43082 A1 | 11/1997 |
| WO | WO 00/00310 A1 | 1/2000 |
| WO | WO 02/090032 A1 | 11/2002 |
| WO | WO 2006/126953 A1 | 11/2006 |
| WO | WO 2008/060225 A1 | 5/2008 |
| WO | WO 2010/090557 A1 | 8/2010 |
| WO | WO 2012/081346 A1 | 6/2012 |
| WO | WO 2013/144211 A1 | 10/2013 |
| WO | WO 2013/144251 A1 | 10/2013 |
| WO | WO 2014/022625 A1 | 2/2014 |

OTHER PUBLICATIONS

European Office Action dated Aug. 13, 2018 for Application No. 13 186 257.5.
English translation of a Korean Office Action issued in Korean Application No. 10-2016-7010473 dated Aug. 25, 2017.
English translation of the Chinese Office Action and Search Report issued in Chinese Application No. 201480052777.0 dated May 15, 2017.
European Office Action, dated Jul. 12, 2016, for European Application No. 13 186 388.8.
Chinese Office Action and Search Report, dated Sep. 1, 2017, for Chinese Application No. 201480052749.9.
English translations of the Chinese Office Action and Search Report, dated Jul. 31, 2017, for Chinese Application No. 201480052776.6.
English translations of the Russian Office Action and Search Report, dated Jun. 1, 2017, for Russian Application No. 2016106302.
English translation of the Japanese Office Action, dated Mar. 27, 2017, for Japanese Application No. 2016-517375.
English translation of Korean Office Action for Appl. No. 10-2016-7010585 dated Apr. 24, 2017.
English translation of Korean Office Action for Appl. No. 10-2016-7010460 dated Jan. 4, 2018.
English translation of the Taiwanese Office Action and Search Report, dated Jun. 23, 2016, for Taiwanese Application No. 103126724.
English translations of the Taiwanese Office Action and Taiwanese Search Report, dated Apr. 15, 2016, for Taiwanese Application No. 103131709.
International Search Report, issued in PCT/EP2014/069421, dated Jan. 16, 2015.
Rassmus et al., "Joining aspects on large plate heat exchangers in stainless steel", Proceedings of the 3rd International Brazing and Soldering Conference, Apr. 24-26, 2006, Crowne Plaza Riverwalk Hotel, San Antonio, Texas, USA, pp. 357-362.
Written Opinion of the International Searching Authority, issued in PCT/EP2014/069421, dated Jan. 16, 2015.
U.S. Appl. No. 14/903,464, filed Jan. 7, 2016.
U.S. Appl. No. 14/910,773, filed Feb. 8, 2016.

* cited by examiner

BRAZING CONCEPT

The present invention relates to a novel brazing concept, a blend, a composition, a product. The present invention relates further to a method for providing a brazed product, to a brazed product obtained by the method, and to uses.

BACKGROUND

Today there are different joining methods for joining together alloys having high melting temperatures. By high temperature a melting temperature higher than 900° C. is intended. One common method which is used is welding. Welding refers to a method wherein the base material with or without additional material is melted, i.e. creation of a cast product via melting and re-solidification. Another joining method is brazing. During the brazing process a braze filler is added to the base material, and the braze filler is melted during the process at a temperature above 450° C., i.e. forming a liquid interface, at a temperature lower than liquidus temperature of the base material to be joined. When brazing the liquid interface should have good wetting and flow. Soldering is a process in which two or more metal items are joined together by melting and flowing of a filler metal, i.e. a solder, into the joint, the solder having a lower melting point than the work-piece. In brazing, the filler metal melts at a higher temperature than the solder, but the work-piece metal does not melt. The distinction between soldering and brazing is based on the melting temperature of the filler alloy. A temperature of 450° C. is usually used as a practical delineating point between soldering and brazing.

When brazing a braze filler is applied in contact with the gap or the clearance between the base material to be joined. During the heating process the braze filler melts and fills the gap to be joined. In the brazing process there are three major stages the first stage is called the physical stage. The physical stage includes wetting and flowing of the braze filler. The second stage normally occurs at a given joining temperature. During this stage there is solid-liquid interaction, which is accompanied by substantial mass transfer. The base material volume that immediately adjoins the liquid filler metal either dissolves or is reacted with the filler metal in this stage. At the same time a small amount of elements from the liquid phases penetrates into the solid base material. This redistribution of components in the joint area results in changes to the filler metal composition, and sometimes, the onset of solidification of the filler metal. The last stage, which overlaps the second, is characterized by the formation of the final joint microstructure and progresses during solidification and cooling of the joint.

A method closely related to welding and brazing is diffusion brazing (DFB) also called Transient Liquid-phase bonding (TLP), or Activated Diffusion Bonding (ADB). Sometimes diffusion bonding is mentioned, but diffusion bonding refers to diffusion brazing or diffusion welding and now diffusion bonding is considered to be a non-standard term.

Diffusion brazing (DFB), Transient Liquid-phase bonding (TLP), or Activated Diffusion Bonding (ADB) is a process that coalesces, or joins, metals by heating them to a suitable brazing temperature at which either a preplaced filler metal will melt or flow by capillary attraction or a liquid phase will form in situ between two surfaces in contact with each other. In either case, the filler metal diffuses into the base material until the physical and mechanical properties of the joint become almost identical to those of the base metal. Two critical aspects of DFB, TLP, or ADB are that:

a liquid must be formed and become active in the joint area; and extensive diffusion of the filler metal elements into the base material must occur.

Ways of obtaining a joint close or the same as the one obtained when DFB, TLP, or ADB is used, but has the advantage of brazing, e.g. having the possibility to braze larger gaps etc, is by using a brazing technique and braze fillers disclosed by WO 2002/38327, WO 2008/060225 and WO 2008/060226. By using a braze filler, i.e. a braze alloy, with a composition close to the base material but with added melting point depressants, e.g. silicon and/or boron and/or phosphorus. By doing this the braze joint will have a composition close to the base material after brazing since braze filler had a similar composition as the base material, the braze filler blends with the base material due to dissolution of the base material and the melting point depressants diffuses into the base material.

There are many reasons for selecting a certain joining method, such as cost, productivity, safety, speed and properties of the joined product. Closely related E-modules will decrease the risk of high stresses in the material with higher E-module when the material is loaded. When the thermal expansion coefficient is similar the result will decrease the thermally induced stresses. When the electrochemical potential is similar the result will decrease the risk for corrosion.

The use of fillers, i.e. alloys, when joining base metals is a complicated process. The filler has to be in a form that could be applied to the base metal before heating. Usually the fillers are particles suitably produced by atomization, but the fillers may also be in form of foils produced by "melt-spinning", i.e. rapid solidification (RS). Regarding RS only a limited number of compositions are possible to produce by RS. The number of compositions that can be made as particles, i.e. powder, is greater and the normal production of powders is by atomizing. When the fillers are in form of powders then they are often combined with binders to form a paste, which could be applied to the base metal in any suitable way. To produce foils or to produce alloy powders are complicated processes and therefore costly. When powders are used the powders are suitable applied in form of a paste as mentioned above, this will add an extra step to the process since the paste need to be blended with the binders and other components, which are beneficial for the paste's properties. For both processes a great amount of work is carried out to get the right form, properties, shape and composition of the filler before melting and joining.

The Invention

A purpose for the invention is to reduce the process steps when joining substrates of parent materials. Another purpose is to simplify the joining of the parent materials and thus reduce costs.

If possible, when selecting braze fillers, a composition close to the parent material is beneficial, since the parent material has been selected for the product purposes. If it would have been possible and cost was no limit, it would be best to develop one braze filler for each parent material. Therefore, another purpose with the invention is to decrease the needed number of braze fillers.

Accordingly, the present invention provides a solution to the technical problems and purposes by the novel and inventive brazing concept. Thus the first aspect of the present invention relates to a blend of at least one phosphorous source and at least one silicon source, wherein silicon together phosphorous are present in the blend in at least 25 wt %. The blend is a mechanical blend of powders and each particle in the blend is either a phosphorous source particle or a silicon source particle.

According to another alternative silicon together phosphorous are present in the blend in at least 30 wt %, preferably in at least 35 wt %, most preferred in at least 40 wt %.

A mechanical blend of powders refers to mechanical mixing of two or more components. The mechanical blend of powders are particles from different sources, each particles is either a boron source or a silicon source.

The blend according to the invention could be applied on substrates the blend could be in a composition. The composition could comprise a binder or the composition could be a bath, but the composition could also be a paste, a dispersion etc. The applied composition and the substrate is exposed to heat and the blend of phosphorous source and the silicon source alloy with the elements on the surface of the parent material of the substrate and an alloy layer is formed on the surface which layer has a melting point lower than the parent material of the substrate, i.e. a layer of braze alloy is obtained on the parent material. The phosphorous source and the silicon source are melting point depressant sources. The substrate having the layer of braze alloy may be cooled to produce a product which can be further processed later on, or the substrate having the layer of braze alloy may be in contact with another substrate of parent material to produce a product having brazed joints at the contact areas or contact points. The substrate with the applied blend could be exposed to brazing heat and the elements of the blend will alloy with the elements on the surface of the parent material and produce a coated product wherein the coated layer will have different properties than the parent material depending on the elements in the blend and the temperature.

Substrates in context of the invention refer to parts of an obtainable product the parts could be for instance but not limited to thick parts such as parts of separators or parts of decanters etc. or thin parts such as plates or coils. The substrates could be any parts that should be joined or coated. Substrate could also be work-pieces. The substrates are of parent materials, i.e. material to be brazed. Parent material refers to a metal or an alloy. Alloy is defined as an intimate association or compound of two or more elements, the alloy possessing a marked degree of all or most of those characteristics commonly described as metallic. Alloys are compounds not mere mixtures. A metal refers to an element which has metallic properties.

Compounds are combinations of two or more elements. Glass, steel, iron oxide are compounds wherein every atom is attracted by all the adjacent atoms so as to make a uniform or very nearly uniform solid, such bodies are clearly not mere mechanical mixtures, chemical compounds of varying or indefinite composition such as silicates, polymers are chemically combined but are compound of varying compositions. A mechanical blend of powders refers to mechanical mixing of two or more components. The mechanical blend of powders are particles from different sources, each particles is either a phosphorous source or a silicon source.

The invention relates to a blend of at least one phosphorous source and at least one silicon source. Silicon (Si) is a tetravalent metalloid and not a metal. Silicon together with at least one other element can be an alloy, when they are in a compound together and "the other element" is a metal element.

The silicon source has higher melting point than the brazing temperature of the created braze alloy. Silicon is not comprised in a compound or alloy which melts at the brazing temperature. Brazing temperature is the temperature where the brazing alloy is in a molten phase and it is possible to join two substrates to produce a brazed joint at the contact areas/points.

Phosphorous (P) is non-metallic and belongs to the nitrogen group. Phosphorus exists in several forms, i.e. allotropes, and the allotropes exhibit strikingly different properties. The two most common allotropes are white phosphorus and red phosphorus, but due to its high reactivity, phosphorus is never found as a free element on earth. Phosphorous oxidation numbers are I, II, and III. Phosphorous is hard to use in pure form since P is very reactive meaning that the P is not possible to add in pure form, since P e.g. has a very low melting point and will therefore not be left on a surface at high (>900° C.) temperatures.

The blend according to the invention comprises at least one silicon source, which is selected from the group consisting of elemental silicon, an alloy containing silicon, and a compound containing silicon.

According to one alternative may the blend comprise a silicon source selected from elemental silicon, ferro-silicon, silicon carbides, and silicon borides.

According to another alternative the phosphorous source is not in the same alloy as the silicon source.

According to one alternative may the blend comprise at least one phosphorous source, which is selected from the group consisting of an alloy containing phosphorous, and a compound containing phosphorous According to a further alternative the phosphorous source may be selected from the group consisting of manganese phosphides, nickel phosphides, potassium phosphides, reducible oxygen-containing phosphorus compounds, ammonium salts of phosphorus compounds, oxides of phosphorous, hypo-phosphoric acids, pyro-phosphoric acid, ammonium salts of phosphorus compounds.

According to a further alternative the phosphorous source may be selected from the group consisting of $Mn_xP_y$, MnP, $Mn_2P$, $Mn_2P_3$, $Mn_3P_2$, NiP, FeP, different phosphites, different phosphates.

Other possible phosphides according to the invention are potassium phosphides, $K_3P$, $K_4P_3$, $K_5P_4$, KP, $K_4P_6$, $K_3P_7$, $K_3P_{11}$, $KP_{10.3}$, $KP_{15}$, or nickel phosphides, $Ni_3P$, $Ni_5P_2$, $Ni_{12}P_5$, $Ni_2P$, $Ni_5P_4$, NiP, $NiP_2$, $NiP_3$.

The blend is a mechanical blend of powders, and the particles in the powders may have an average particle size less than 250 μm, preferably the particles in the powders have an average particle size less than 160 μm, more preferred the particle have an average particle size less than 100 μm.

The second aspect of the invention relates to a composition. The composition comprises a blend according to the first aspect of the invention.

According to one example, the composition may further comprise powders of a parent material in combination with any one of the alternatives of the blend according to the first aspect.

According to another example, the composition may further comprise powders of a parent material, wherein the parent material is present in an amount less than 75 wt % calculated on the total weight of silicon, phosphorous and parent material.

According to another example, the composition may further comprise additional hard particles selected from hard particles selected from particles based on oxides, nitrides, carbides, borides, or mixtures thereof, and wherein the hard particles have wear resistance properties in combination with any one of the alternatives of the blend according to the first aspect.

According to another example the particles having catalytic properties are for instance titan oxides, magnesium oxides, zink oxides etc.

According to another example the particles having wear resistance properties are one or more of tungsten carbide, (cubic) boron nitride, titanium nitride, diamonds, metal composites, chromium borides. The particles pre-plated with metals for instance nickel.

According to another example, the composition may further comprise powders of a braze alloy in combination with any one of the alternatives of the blend according to the first aspect.

According to another example the composition further comprises powders of a braze alloy and the braze alloy is present in an amount less than 80 wt % calculated on the total weight of silicon, phosphorous and parent material.

A braze alloy refers to a parent material which is alloyed with melting point depressants, and thus received a lower melting point than the parent material.

According to a further example the composition further comprises at least one binder selected from solvents, water, oils, gels, lacquers, varnish, polymers, wax or combinations thereof.

As an example the binder may be selected from polyesters, polyethylenes, polypropylenes, acrylic polymers, (met)acrylic polymers, polyvinyl alcohols, polyvinyl acetates, polystyrenes, waxes.

According to a further example, the binder may be a polyester, a wax or combinations thereof.

According to a further example, the composition is a paint or the composition is a paste or the composition is a dispersion or the composition is a plating bath.

According to a further example, the binder is a gel, and the composition is a paste.

One advantage when the composition is a paste is that the paste easily can be applied to selected areas on the substrate.

According to a further example, the binder is a lacquer or a varnish, and the composition is a paint.

One advantage of a composition being a paint is that the paint easily can be distributed over the surface of the substrate and adhere to the surface and therefore can be handled during for instance transportation, pressing, cutting etc.

According to a further example, the binder is selected from polyesters, polyethylenes, polypropylenes, acrylic polymers, (met)acrylic polymers, polyvinyl alcohols, polyvinyl acetates, polystyrenes, waxes or combinations thereof, and the composition is a paint or the composition is a paste.

According to a further example, the binder is selected from polyesters, polyethylenes, polypropylenes, acrylic polymers, (met)acrylic polymers, polyvinyl alcohols, polyvinyl acetates, polystyrenes, waxes or combinations thereof, and the composition is a paint.

According to a further example, the binder is selected from polyesters, polyethylenes, polypropylenes, acrylic polymers, (met)acrylic polymers, polyvinyl alcohols, polyvinyl acetates, polystyrenes, waxes or combinations thereof, and the composition is a paste.

According to a further example the composition is a plating bath for electroless plating or for electro plating.

According to a further example, the blend is dispersed in the binder.

According to a further example, the composition is a dispersion.

One advantage when the composition is a dispersion, is that the binder can easily be evaporated off after the dispersion is applied on the surface of the substrate. Another advantage is less additional carbon is incorporated in the braze alloy.

According to a further example the composition may comprise at least one element selected from Ni, Cr, Co, Pd, Cu, Au, and Ag and the element(s) may be comprised in an electroless (autocatalytic) plating bath.

According to a further example the composition may comprise that the electroplating bath could be a Ni electroplating bath.

According to a further example the composition may comprise that the particles of the blend according to the first aspect are dispersed in the electroplating bath.

According to a further example the composition may comprise that the particles of the blend according to the first aspect are dispersed in the electroless (autocatalytic) plating bath.

According to a further example the composition may comprise sodium hypophosphite ($NaPO_2H_2 \cdot H_2O$).

Electroless plating or formally autocatalytic plating is a chemical technique used to deposit a layer of a metal or an alloy on a solid workpiece, such as metal. The process involves the presence of a chemical reducing agent in solution to reduce metallic ions to the metal state. It is chemical plating method that involves several simultaneous reactions without the use of an applied external electrical current. The chemical reduction is catalyzed by the metal or alloy being deposited. If properly controlled, the process takes place only on catalytic surfaces rather than throughout the solution. Such plating has been used to yield deposits of Ni, Cr, Co, Pd, Au, and Ag as well as alloys containing these metals plus P or B. A major benefit of this technique is that it is possible to plate a layer with uniform thickness on diverse shapes and types of surface. The downside is that the plating process is usually slower and cannot create such thick plates of metal. The most common electroless plating method is electroless deposition of Ni and Ni-alloys with P or B. The reducing agent for electroless Ni plating is normally sodium hypophosphite ($NaPO_2H_2 \cdot H_2O$).

Electroplating is an electrochemical process (electrodeposition) that uses an external electrical current to reduce dissolved metal ions so that they form a layer of metal or alloy on an electrode (cathode). The deposition of a metallic coating onto an object is achieved by applying a negative charge on the object to be coated and immersing it into a solution which contains a salt of the metal(s) to be deposited. The negatively charged object (that is to be electroplated) provides electrons to reduce the positively charged ions to metallic form. A major benefit of this technique is that it is possible to plate thick layers of metal, but it is difficult to form a layer with uniform thickness on objects with complicated shapes or surfaces.

Both electroless plating and electroplating allows codeposition of inert particles in the plated metal layer. Particles held in suspension in a plating bath are built into the deposited layer of metal or alloy. Combining different types of inert particles with different electroless plated or electroplated metals enable the production of a large range of composite materials. The main uses of such composite layers are in wear resistance, corrosion resistance and lubrication. For example, by coating metals with a metallic matrix composite containing particles of hard materials, like diamond, WC and SiC, they can be protected from abrasion.

The third aspect relates to a product wherein the composition according to the examples of the second aspect may be applied on a substrate. The substrate may be a parent material.

According to one example, the product comprises a substrate of a parent material, which parent material has a solidus temperature above 1000° C., and the product comprises also a composition according any one of the examples according to the second aspect, wherein at least a part of the substrate has a surface layer of the composition.

According to one example, the product comprises a substrate of a parent material, which parent material has a solidus temperature above 1100° C., and the product comprises also a composition according any one of the examples according to the second aspect, wherein at least a part of the substrate has a surface layer of the composition.

The new brazing concept provides for example joints which are obtained by a brazing alloy, which brazing alloy is formed in a melting process of the parent material and a blend of boron and silicon. The brazing alloy in molten form is transported by capillary forces to the area of the joint mainly from neighboring areas. The temperature for the brazing concept is above 900° C., i.e. above delineating point between soldering and brazing. The formed braze alloy is an alloy which has apart for the elements of a parent material liquidus temperature lowering elements. Therefore, the braze alloy has a liquidus temperature lower than the parent material.

The parent materials refer to parent metals or parent alloys, said parent metal or parent alloys are suitable to braze. The parent material may be an alloy comprising elements such as iron (Fe), chromium (Cr), nickel (Ni), molybdenum (Mo), manganese (Mn), copper (Cu), cobolt (Co) etc. Examples of such alloys are found in the list in Table 1, the parent materials according to the invention are not limited to the list, and the list exemplifies possible parent materials.

TABLE 1

| Parent materials | Approximate. solidus temperature [° C.] | Approximate. liquidus temperature [° C.] |
| --- | --- | --- |
| Nickel 200/201 | 1435 | 1445 |
| Nicrofer 5923hMo | 1310 | 1360 |
| Hastelloy B3 | 1370 | 1418 |
| Alloy C22 | 1357 | 1399 |
| Inconel 625 | 1290 | 1350 |
| Alloy C 276 | 1325 | 1370 |
| Nicrofer 3033 | 1330 | 1370 |
| Nicrofer 3127HMo | 1350 | 1370 |
| AL6XN | 1320 | 1400 |
| 254SMO | 1325 | 1400 |
| Monel 400 | 1299 | 1348 |
| Mild steel | 1505 | 1535 |
| Stainless steel Type 316 | 1390 | 1440 |
| Stainless steel type 304 | 1399 | 1421 |

There are different parent materials having different solidus temperature, i.e. the temperature point at which a material solidifies. According to the invention may the solidus temperature of the parent material be above 1000° C. According to another alternative may the solidus temperature of the parent material be above 1100° C. According to one alternative of the invention may the solidus temperature of the parent material be above 1220° C. According to another alternative of the invention may the solidus temperature of the parent material be above 1250° C. According to a further alternative of the invention may the solidus temperature of the parent material be above 1300° C.

A molten phase may be the phase that melts and has a lower melting temperature than the substrate, and the molten phase may be obtained when silicon and phosphorus together alloys with the elements on the surface of the substrate.

According to one example the composition is applied on the substrate, and the average total amount of applied silicon and phosphorous is applied in an average amount less than 1 mg/mm$^2$, preferably within a range from 0.01 to 1 mg/mm$^2$, more preferred within a range 0.02 to 0.8 mg/mm$^2$, most preferred within a range 0.03 to 0.7 mg/mm$^2$.

The average total amount of silicon and phosphorous is calculated from the silicon source and the phosphorous source, and is calculated as pure silicon and pure phosphorous.

According to another example the average total amount of applied silicon and phosphorous is applied in an average amount within a range 0.06 to 0.3 mg/mm$^2$ when the substrate has a thickness≤1 mm.

According to another example the average total amount of applied silicon and phosphorous is applied in an average amount within a range 0.06 to 2 mg/mm$^2$ when the substrate has a thickness≥1 mm.

According to another example the product may be obtained by applying the composition according to any one of the examples of the second aspect, on the surface of a substrate, said composition may be applied as a paint, or the composition may be applied as a paste, or the composition may be applied as a dispersion.

According to another example the product according to any one of the examples according to the third aspect may be for brazing of joints between contact areas of substrates or the product may be for coatings of substrates, or the product may be for both brazing of joints and coatings of substrate.

According to another example the parent material of the product may be selected from the group consisting of iron based alloys, nickel based alloys, chromium based alloys, copper based alloys and cobolt based alloys.

According to one example the parent material may comprise from about 15 to about 22 wt % chromium, from about 8 to about 22 wt % nickel, from about 0 to about 3 wt % manganese, from about 0 to about 1.5 wt % silicon, optionally from about 1 to about 8 wt % molybdenum, and balanced with iron, all percentage in percent by weight.

According to another example the parent material may comprise from about 15 to about 22 wt % chromium, from about 8 to about 22 wt % nickel, from about 0.2 to about 3 wt % manganese, from about 0.1 to about 1.5 wt % silicon, optionally from about 1 to about 8 wt % molybdenum, and balanced with iron, all percentage in percent by weight.

According to another example the parent material may comprise from about 15 to about 22 wt % chromium, from about 8 to about 22 wt % nickel, from about 1 to about 3 wt % manganese, from about 0.5 to about 1.5 wt % silicon, optionally from about 1 to about 8 wt % molybdenum, and balanced with iron.

According to another example the parent material may comprise more than 80 wt % Ni.

According to another example the parent material may comprise more than 50 wt % Fe, less than 13 wt % Cr, less than 1 wt % Mo, less than 1 wt % Ni and less than 3 wt % Mn.

According to another example the parent material may comprise more than 10 wt % Cr and more than 60 wt % Ni.

According to another example the parent material may comprise more than 15 wt % Cr, more than 10 wt % Mo, and more than 50 wt % Ni.

According to another example the parent material may comprise more than 10 wt % Fe, 0.1 to 30 wt %, Mo, 0.1 to 30 wt % Ni, and more than 50 wt % Co.

According to another example of the third aspect the surface layer of the material may be provided on at least one side of a substrate or the surface layer of the material is provided on both sides of a substrate.

According to another example of the third aspect the substrates may be coils, plates, sheets, or parts of products.

According to another example of the third aspect the substrates may be cut, formed, pressed or combinations thereof. According to another example the substrates may be heat exchanger plates or reactor plates or parts of separators, or parts of decanters, or parts of valves etc.

At least two substrates of different parent materials, having the surfaces applied with a composition according to the examples of the second aspect, may be joined at the contact areas/points according to the invention when the materials are heated to brazing temperature.

The forth aspect the invention relates to a substrate having a matrix layer of the blend according to the first aspect or a matrix layer of the composition according to the second aspect.

According to another example may the composition comprise a composite layer or a matrix layer with any one of the alternatives of the blend according to the first aspect distributed into a matrix of a plated layer of metal or alloy.

According to another example may the matrix layer comprise a phosphorous source and a silicon source.

The plated layer could be both electroless plated or electroplated. The plated layer would preferentially be a Ni-based alloy, or based on other metals possible to plate through electroless plating or electroplating. The matrix of the plated layer could comprise Ni—B or Ni—P alloy. In addition the blend could contain a boron source. The matrix layer may comprise a silicon source and a boron source. According to another alternative may the matrix comprise a silicon source, a boron source and a phosphorous source.

The surface layer may be applied as a powder of the blend or by means such as physical vapor deposition (PVD), or chemical vapor deposition (CVD). Physical vapor deposition (PVD) is a variety of vacuum deposition and is a general term used to describe any of a variety of methods to deposit thin films by the condensation of a vaporized form of the desired film material onto various work-piece surfaces, e.g. onto semiconductor wafers. The application method involves purely physical processes such as high temperature vacuum evaporation with subsequent condensation, or plasma sputter bombardment rather than involving a chemical reaction at the surface to be coated as in chemical vapor deposition. Chemical vapor deposition (CVD) is a chemical process used to produce high-purity, high-performance solid materials. The process is for example used in the semiconductor industry to produce thin films. In a typical CVD process, the wafer, i.e. the substrate, is exposed to one or more volatile precursors, which react and/or decompose on the substrate surface to produce the desired deposit. Frequently, volatile by-products are also produced, which are removed by gas flow through the reaction chamber.

The fifth aspect the invention relates to a braze alloy layered product obtained by heating a product according to any one of the examples of the third aspect or to the forth aspect to a temperature of at least 900° C., cooling the product to produce a product having a braze alloy layer on the substrate of parent material, said obtained braze alloy layer has a melting point lower than the melting point of the parent material.

According to one alternative may the braze alloy layer have increased level of Si or P, or both Si and P in the surface.

Another example relates to a braze alloy layered product, said braze alloy layered product may comprise a composition according to any one of the examples of the second aspect, said composition comprises a blend, wherein a layer of braze alloy has been obtained on the surface of the substrate by alloying the blend with elements in the surface of the substrate and heating the substrate and the composition to a temperature higher than the solidus temperature of the obtained braze alloy, and that the obtained braze alloy may have a melting point lower than the melting point of the substrate.

According to one example of the braze alloy layered product the substrates may be cut, formed, pressed or combinations thereof before the application of the surface layer of the composition, or wherein the substrates may be cut, formed, pressed or combinations thereof after the application of the surface layer of the composition, or wherein the substrates may be cut, formed, pressed or combinations thereof after obtaining the brazing alloy on the surface of the base metal.

The braze alloy layered product may be obtained by pre-brazing in such a way that the parent material and the surface layer may be heated to a temperature higher than the solidus temperature of the obtained braze alloy in the braze layer and lower than the solidus temperature of the parent material. A layer of braze alloy is obtained on the parent material in a pre-brazing step. The braze alloy in the surface layer may comprise the blend of according to the first aspect and elements of the parent material.

According to one example the products may have other forms and the surface layer of the blend could be on one side of the product, single surface layer, or on two sides of the product, double surface layers, or the blend could be on several sides of the product. The product may be cut, could be formed, could be pressed or combinations thereof, before the application of the surface layer, after the application of the surface layer, or after obtaining the braze alloy layered product.

As a sixth aspect the invention relates to a coated product obtainable by heating a product according to any one of the examples of the third aspect or to the forth aspect to a brazing temperature less than 1250° C., cooling the product to produce a coated product, wherein the coated layer has approximately the same melting point as the parent material(s).

According to one alternative may the coated layer have an increased level of Si or P, or both Si and P in the surface.

As a seventh aspect the invention relates to a method of providing a product having at least one brazed joint between contact areas of substrates comprising:

Step (i) applying at least one silicon source and at least one phosphorous source on at least one substrate;

Step (ii) assembling the applied substrates with at least one additional substrate with or without applied silicon source or phosphorous source;

Step (iii) heating the assembled substrates to a brazing temperature below 1250° C. in a furnace in vacuum, in an inert gas, in a reducing atmosphere, or combinations thereof; and Step (iv) cooling the assembled substrates and obtaining a product having at least one brazed joint between contact areas of the substrates.

Contact areas refer to the areas where a first substrate is in contact with a second substrate, and where a joint will be formed during brazing.

Assembling refers to stacking of for instance plates but not limited to, such as heat exchanger plates. Assembling refers further to assembling of parts.

According to one example the method may comprise applying a mechanical blend of at least one silicon source and the at least one phosphorous source.

According to another example the method may comprise that the at least one silicon source may be applied as one layer on the substrate, and the at least one phosphorous source may be applied as another layer on the substrate.

According to one example the method may comprise that the at least one phosphorous source may be applied as one first layer on the substrate, and the at least one silicon source may be applied as second layer on top of the first layer on the substrate.

According to one example the method may comprise that the at least one phosphorous source may be applied as one layer on a first substrate and at least one silicon source may be applied as one layer on a second substrate prior to assembling the two substrates in step (ii) and providing joints between contact areas between the two substrates in step (iii).

According to one example the method may comprise that the at least one silicon source and at least one phosphorous source may be within the same blend and silicon and phosphorous may be present in the blend within the range 25 wt % to 100 wt %, and that the blend is a mechanical blend of powders.

According to one example the method may comprise that $Mn_3P_2$ may be applied as a single melting point depressant for producing joints in the contact areas.

According to another example the method may comprise that step (i) comprises applying a composition comprising a blend of at least one silicon source and at least one phosphorous source, and that the composition is applied on at least part of one surface on at least one substrate.

According to a further example the method may comprise that step (i) comprises applying the composition as a paint on at least part of one surface on at least one substrate.

According to a further example the method may comprise that step (iii) comprises heating the assembled substrates, obtaining a molten phase of braze alloy on the substrate(s) and letting the molten phase be transferred by capillary forces to the contact areas between the substrates.

A molten phase may be the phase that melts and has a lower melting temperature than the substrate, and the molten phase may be obtained when silicon and phosphorous alloys with the elements on the surface of the substrate.

One example of the method, the heating step, step (iii), comprises heating the product to a temperature of at least 900° C., preferably of at least 1000° C., more preferred of at least 1040° C., most preferred of at least 1100° C.

One example of the method comprises an additional step before the applying step, i.e. step (i), said additional step comprises cutting or forming or combinations thereof of the substrate(s) prior to the applying step.

Another example of the method comprises an additional step between the applying step, i.e. step (i), and the assembling step, i.e. step (ii), said additional step comprises cutting or forming or combinations thereof of the product from the applying step prior to the assembling step.

Another example of the method comprises a first additional step after the applying step, the first step additional step comprises heating the product from the applying step to a temperature to allow obtaining of a braze alloy layer on the substrate, and cooling the obtained substrate having the obtained layer of braze alloy.

Another example of the method comprises a second additional step, wherein the second additional step comprises the cutting or forming or combinations thereof of the substrate having the obtained layer of braze alloy.

According to one example the method may comprise that brazed heat exchanger plates or brazed reactor plates may be obtained.

According to one example the method may comprise that the obtained brazed product is selected from heat exchangers, plate reactors, parts of reactors, parts of separators, parts of decanters, parts of pumps, parts of valves.

According to one example the brazed product that may be obtained in step (iv) may be provided with a joint(s) obtained by obtaining a brazing alloy in a melting process of the parent material and the blend according to the first aspect, and transporting by capillary forces the brazing alloy in melted form to the area of the joint(s) mainly from neighboring areas.

According to the invention may the solidus temperature of the parent material be above 1000° C. According to another alternative may the solidus temperature of the parent material be above 1100° C. According to one alternative of the invention may the solidus temperature of the parent material be above 1220° C. According to another alternative of the invention may the solidus temperature of the parent material be above 1250° C. According to a further alternative of the invention may the solidus temperature of the parent material be above 1300° C.

According to one example the obtained product may be brazed at a temperature below 1250° C. According to another example may the product be brazed at a temperature below 1210° C. According to a further example the product may be brazed at a temperature above 1000° C. According to a further example the product may be brazed at a temperature above 1100° C. According to a further example the product may be brazed within a range from about 1000° C. to about 1250° C. According to a further example the product may be brazed within a range from about 1100° C. to about 1210° C.

The eighth aspect relates to a brazed product obtained by the method according to the examples of seventh aspects may have joints. The joints of the brazed product are obtained by the formed braze alloy, which braze alloy is formed in a melting process from the base metal and the blend, and flown to the joint from neighboring areas, elements found in the brazing alloy apart from the parent material elements are Si, P and optionally C, and wherein the parent material has a solidus temperature above 1000° C. According to one alternative may the solidus temperature of the parent material be above 1100° C. According to one alternative of the invention may the solidus temperature of the parent material be above 1220° C. According to another alternative of the invention may the solidus temperature of the parent material be above 1250° C. According to a further alternative of the invention may the solidus temperature of the parent material be above 1300° C.

In the brazed product obtained by the method the volume of the formed braze alloy is calculated from the following formula, see also FIG. 2:

Volume=total area $A$×length of joint

Total area $A=((X-B)/2)\times((X-B)/2)\times\tan \alpha$

Wherein A is total area of the two triangles, X is the total width of the formed joint, B is the part of the formed joint where the volume of the formed braze alloy in the center of the joint is negligible, and the height is calculated by measuring the angle α, which is the angle of the between tangent of the pressed beam to the base.

The ninth aspect relates to a method for providing a product having a matrix layer according to the first aspect or the second aspect, wherein the method comprises the following steps:

Step (i) applying a composition according to any one of the examples of the second aspect on at least a part of at least one surface on at least one substrate;

Step (ii) obtaining a product where the composition is applied on at least a part of a surface on at least one substrate.

The tenth aspect relates to a method for providing a braze alloy layered product, which method comprises the following steps:

Step (i) applying a composition according to any one of the examples of the second aspect on one or more substrates obtaining a first intermediate product; and Step (ii) heating the product from step (i) to a temperature higher than the solidus temperature of the obtained braze alloy and lower than the solidus temperature of the substrate, and obtaining a molten phase of braze alloy; and Step (iii) cooling the heated product from step (ii), and obtaining a braze layered product having a layer of braze alloy on the surface of the substrate.

The eleventh aspect relates to a method for providing a braze alloy layered product comprising:

Step (i) applying a composition according to any one the examples of the second aspect on one or more substrates;

Step (ii) heating the applied substrate from the applying step to a temperature higher than the solidus temperature of the obtained braze alloy and lower than the solidus temperature of the substrate, and obtaining a layer of molten phase of braze alloy; and Step (iii) cooling the substrate having the molten phase of braze alloy and obtaining a braze alloy layered product.

The twelfth aspect relates to a use of a blend according to any one of the examples of the first aspect, said blend is used as melting point depressants for providing a braze alloy on a surface of a substrate.

The thirteenth aspect relates to a use of a composition according to any one of the examples of the second aspect, for brazing of parts or plates of heat exchangers, plates of reactors, parts of reactors, parts of separators, parts of decanters, parts of pumps, parts of valves.

The fourteenth aspect relates to a use of a composition for brazing of parts or plates for heat exchangers, plate reactors, parts of reactors, parts of separators, parts of decanters, parts of pumps, parts of valves, wherein the composition is a paint.

Examples of products having brazed joints according to the invention are parts or plates for heat exchangers, plate reactors, parts of reactors, parts of separators, parts of decanters, parts of pumps, parts of valves.

Other embodiments and alternatives are defined by the claims.

In the following will the invention be explained by the use of FIGS. 1 to 7. The figures are for the purpose of demonstrating the invention and are not intended to limit its scope.

DETAILED DESCRIPTION OF THE DRAWINGS

Figure 1:
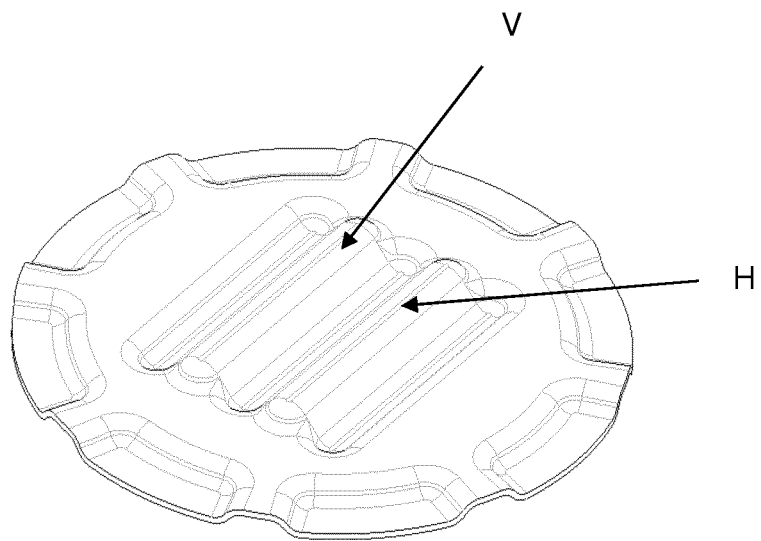
FIG. 1 is showing a circular pressed plate use in the Examples.

FIG. 1 is showing a circular pressed plate, which is 42 mm in diameter and 0.4 mm thick, made of stainless steel type 316L. The pressed plate had two pressed beams V and H, each app 20 mm long. Beam V or v stands for left beam and beam H or h stands for right beam, and v and h are used in Example 2.

Figure 2:
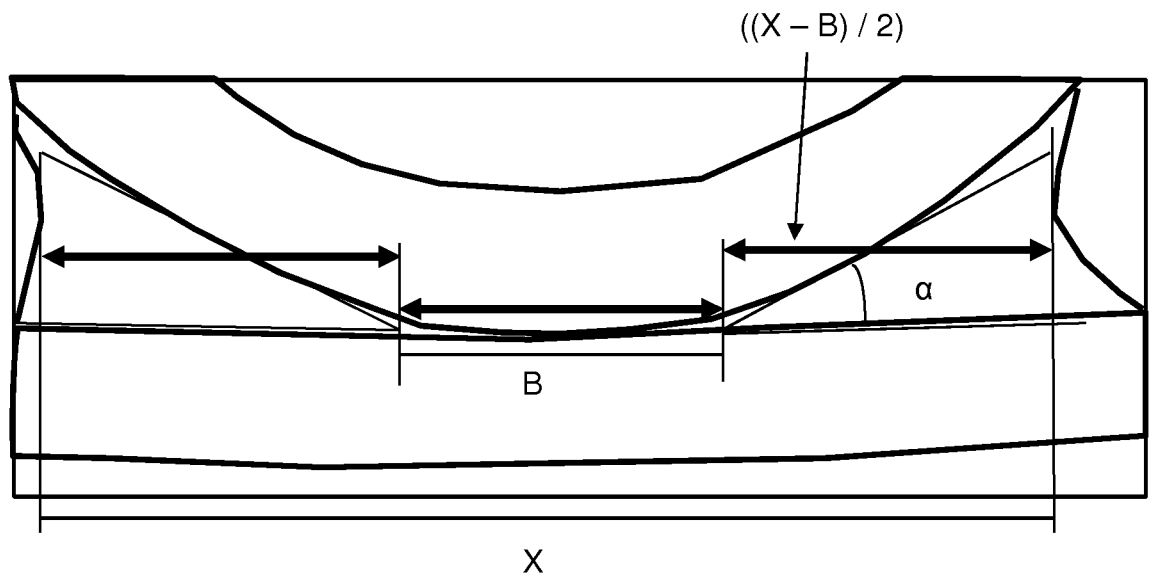
FIG. 2 is showing a graph of "Approximation".

FIG. 2 shows approximation 1 which is based on a cross section of a brazed test sample. The cross section in FIG. 2 shows the pressed beam in the top of FIG. 2. In the bottom of FIG. 2 is the flat, earlier applied plate. In the capillary between the beam and the flat surface a joint is created. To estimate the amount of braze alloy created in the joint following approximations and calculations have been made. It has been estimated that the volume in the center of the joint is negligible. Therefore, the created braze alloy volume for joints with a width, i.e. width B of 1.21 mm or less, are set to zero. On the outer sides of the beam, i.e. ((X−B)/2), formed braze alloy has been accumulated. Thus, the brazing alloy in molted form has been transported by capillary forces to the area of the joint mainly from neighboring areas forming the volumes braze alloy of the triangles.

According to FIG. 2, it is possible to calculate an area by estimate that two triangles are formed on each side of the center of the joint. The angle in the triangle is measured to app. 28°. The total measured width is called X and the center width, B. The total area (A) of the two triangles are therefore $A=2\times(((X-B)/2)\times((X-B)/2)\times\tan(\alpha)))/2$, i.e. for FIG. 2 $A=2\times(((X-1.21)/2)\times((X-1.21)/2)\times\tan(28)))/2$. The total created volume of braze alloy, which had flown to the crevices, would be the area times the length of the two beams. Some of the formed braze alloy does not flow to the crevices and is left on the surface.

Figure 3:
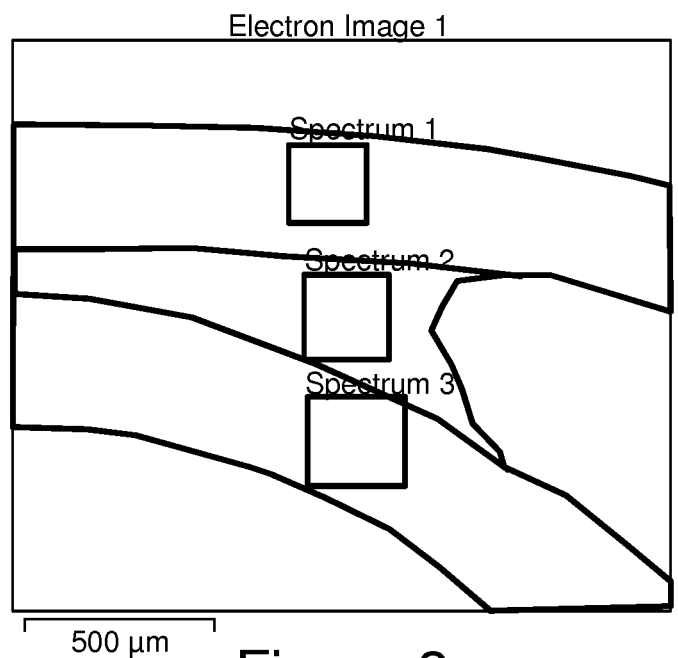
FIG. 3 is showing a cross-sectioned metalurgic sample analysed in SEM-EDX
Figure 4:
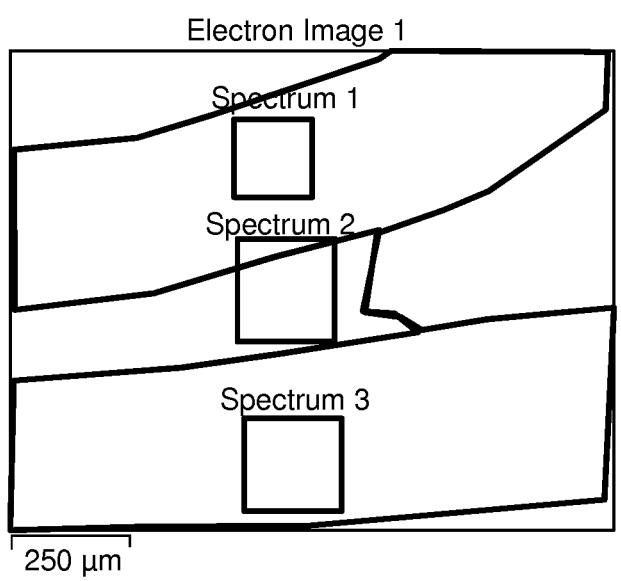
FIG. 4 is showing a cross-sectioned metalurgic sample analysed in SEM-EDX
Figure 5:
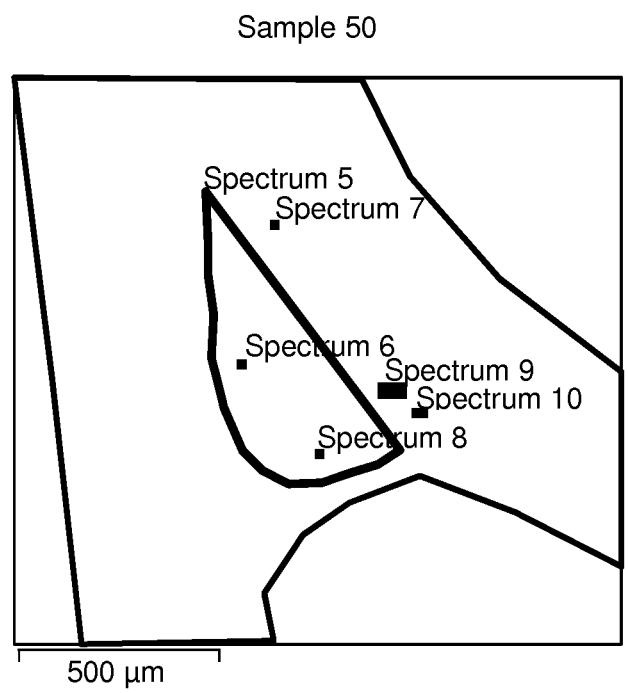
FIG. 5 is showing a cross-sectioned metalurgic sample analysed in SEM-EDX
Figure 6:
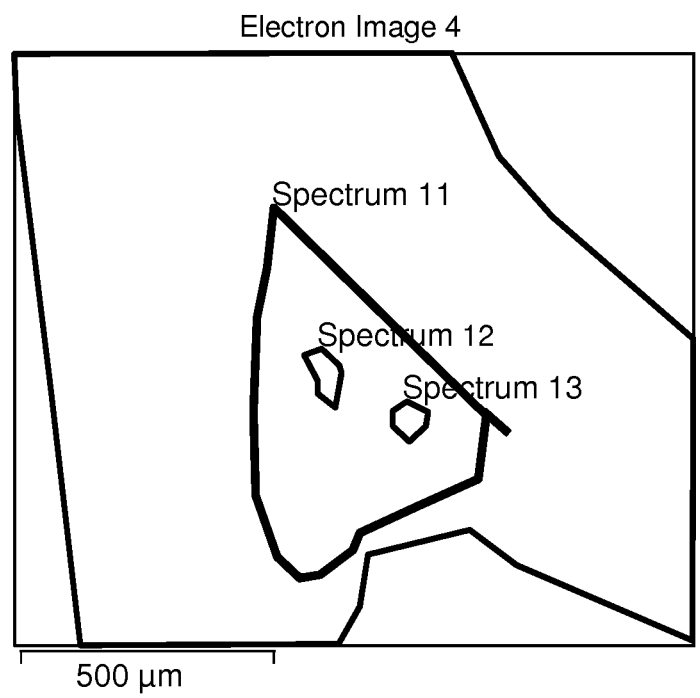
FIG. 6 is showing a cross-sectioned metalurgic sample analysed in SEM-EDX
Figure 7:
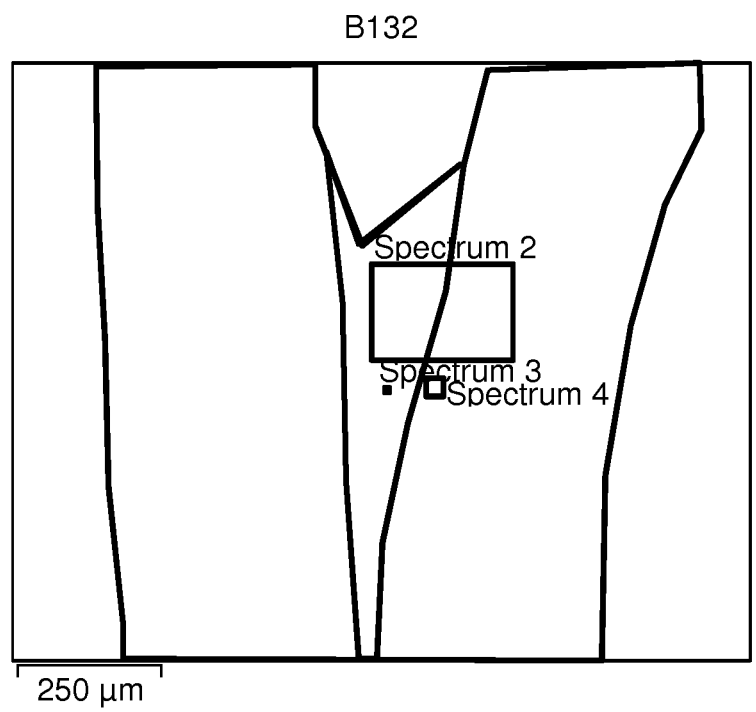
FIG. 7 is showing a cross-sectioned metalurgic sample analysed in SEM-EDX

FIGS. 3 to 7 shows samples which are cross-sectioned and metalurgical investigated. The cross sections are analysed in SEM-EDX, Scanning electron microscope with energy dispersive spectroscopy. Sample A6 ($Mn_3P_2$+Si) was exposed to a temperature of 1140° C. for 2 hours, the result is shown in FIG. 3. Sample B6 ($Mn_3P_2$+Si) was exposed to a temperature of 1140° C. for 2 hours, the result is shown in FIG. 4. Sample NiP was exposed to a temperature of 1120° C. for 2 hours, the result is shown in FIG. 5. Sample (NiP+Si) was exposed to a temperature of 1120° C. for 2 hours, the result is shown in FIG. 6. Sample $Mn_3P_2$ was exposed to a temperature of 1120° C. for 2 hours, the result is shown in FIG. 7.

EXAMPLES

The tests in these Examples were made to investigate if silicon, Si, is able to create a braze alloy when applied on the surface of a test sample of base metal. Also different amounts of phosphorous, P, were added since phosphorous also can decrease the melting point for braze alloys. Properties of the tested blends were also investigated. In the Examples wt % is percent by weight and atm % is percent of atoms.

If nothing else is stated the test samples of parent metal for all tests were cleaned by dish washing and with acetone before samples of the blends of silicon and phosphorous source were added to the test samples.

Example 1

Measure of Binder (Polymeric and Solvent) Content in the S-20 Binder

Also the content of "dry" material within the S-20 binder was tested. The sample of S-20 binder was Nicrobraz from Wall Colmonoy. The test sample was weighted and thereafter the sample of the wet binder were dried in room temperature for 24 h. The results can be found in Table 2.

TABLE 2

| Sample | Clean plate [g] | Plate with wet binder [g] | Plate with dry binder [g] | Weight wet binder [g] | Weight dry binder [g] | Dry weight of binder [wt %] |
|---|---|---|---|---|---|---|
| S20 binder | 4.36 | 4.92 | 4.38 | 0.56 | 0.02 | 3.57 |

Examples 2

Two different blends were used in Example 1. The blends were $Mn_3P_2$ together with Si, see Table 3. The blends were tested as melting point depressants.

TABLE 3

| Blend | Si [g] | $Mn_3P_2$ [g] | Sum Si + $Mn_3P_2$ [g] | $(Mn_3P_2):(Si)$ [g]/[g] | S20 wet [g] | Total weight [g] |
|---|---|---|---|---|---|---|
| A | 4.07 | 10.0 | 14.07 | 2.46:1 | 16.80 | 30.87 |
| B | 6.15 | 10.0 | 16.15 | 1.63:1 | 15.98 | 32.13 |

Circular test pieces of type 316 stainless steel, diameter 42 mm were applied with the blends. On each test piece (test piece+blend) was a pressed waffle of type 254 SMO was placed. The samples were heat treated for app 2 h in full vacuum at different temperatures for each test. Different amounts of the two blends were used in the tests.

Test samples A1, A2, A3, B1, B2, and B3 were heat treated for app 2 h in full vacuum at 1120° C. Test samples A4, A5, A6, B4, B5, and B6 were heat treated for app 2 h in full vacuum at 1140° C.

TABLE 4

| Blend | Temperature [° C.] | Applied Blend + Dry Binder [g] |
|---|---|---|
| A1 | 1120° C. | 0.22 |
| A2 | 1120° C. | 0.13 |
| A3 | 1120° C. | 0.14 |
| A4 | 1140° C. | 0.33 |

TABLE 4-continued

| Blend | Temperature [° C.] | Applied Blend + Dry Binder [g] |
|---|---|---|
| A5 | 1140° C. | 0.10 |
| A6 | 1140° C. | 0.16 |
| B1 | 1120° C. | 0.19 |
| B2 | 1120° C. | 0.09 |
| B3 | 1120° C. | 0.16 |
| B4 | 1140° C. | 0.16 |
| B5 | 1140° C. | 0.34 |
| B6 | 1140° C. | 0.14 |

The width of the created joints were measured as a function of applied amount, blend and heat treating temperature, see FIG. 2. The calculated width are summerised in Table 5.

TABLE 5

| Sample | Blend on Waffel [g] | Width of Joint Triangle 1 [μm] | Width of Joint Triangle 2 [μm] |
|---|---|---|---|
| A1 | 0.22 | 2961 | 3050 |
| A2 | 0.13 | 1640 | 1610 |
| A3 | 0.14 | 2070 | 2240 |
| B1 | 0.19 | 2170 | 2290 |
| B2 | 0.09 | 1240 | 1220 |
| B3 | 0.16 | 2010 | 1600 |
| A4 | 0.33 | 3107 | 2993 |
| A5 | 0.10 | 1832 | 1810 |
| A6 | 0.16 | 2195 | 2202 |
| B4 | 0.16 | 1833 | 1811 |
| B5 | 0.34 | 3264 | 3238 |
| B6 | 0.14 | 1470 | 1662 |

The samples were cross-sectioned and metalurgical investigated. The cross sections were analysed in SEM-EDX (Scanning electron microscope with energy dispersive spectroscopy). The investigations shows that the main part of the composition of the joint is a blend of the two parent material used, i.e. 316 and SMO. For the analysed samples the major part of the composition in the joints origin from the parent materials.

Approximate values for the elements of 316 and SMO are summarized in Table 6.

TABLE 6

| Element | 316 [wt %] | SMO [wt %] |
|---|---|---|
| C | 0.03 max | 0.02 max |
| Si | 1.0 max | 0.8 max |
| P | 0.045 max | 0.030 max |
| Cr | 16.5-18.5 | 19.5-20.5 |
| Mn | 2.00 max | 1.0 max |
| Fe | Balance (~65) | Balance (~53) |
| Ni | 10.0-13.0 | 17.5-18.5 |
| Mo | 2.0-2.5 | 6.0-6.5 |
| Cu | — | 0.5-1.0 |
| Total | 100.00 | 100.00 |

The analysed joint of test sample A6 is shown in Table 7, see also FIG. 3.

TABLE 7

| Element | Spectrum 1 [wt %] | Spectrum 2 [wt %] | Spectrum 3 [wt %] |
|---|---|---|---|
| C | 3.04 | 2.86 | 2.95 |
| Si | 0.40 | 2.40 | 1.52 |
| P | — | 1.43 | 0.76 |
| Cr | 16.11 | 18.00 | 17.33 |
| Mn | 1.50 | 1.63 | 1.35 |
| Fe | 62.90 | 50.54 | 51.15 |
| Ni | 13.88 | 18.00 | 20.76 |
| Mo | 2.17 | 5.16 | 4.17 |
| Total | 100.00 | 100.00 | 100.00 |

The analysed joint of test sample B6 is shown in Table 8, see also FIG. 4.

TABLE 8

| Element | Spectrum 1 [wt %] | Spectrum 2 [wt %] | Spectrum 3 [wt %] |
|---|---|---|---|
| C | 2.87 | 2.86 | 2.77 |
| Si | 0.43 | 2.58 | 0.42 |
| P | 0.17 | 1.76 | — |
| Cr | 18.75 | 16.72 | 16.61 |
| Mn | — | 2.41 | 1.46 |
| Fe | 50.56 | 50.18 | 16.61 |
| Ni | 21.70 | 18.90 | 13.63 |
| Mo | 5.53 | 4.58 | 1.91 |
| Total | 100.00 | 100.00 | 100.00 |

Example 3

Example 3 circular test pieces of type 316 stainless steel, diameter 42 mm were applied with Ni—P plated 316, and NiP plated 316 together with a layer of Si on top of the NiP plated layer. A pressed waffle of type 254 SMO were placed on top of each sample. The test pieces were heat treated for app 2 h in full vacuum at 1120° C. The analysed joint of test sample Ni—P plated 316 is shown in Table 9, see also FIG. 5. The thickness of NiP is 50 μm.

TABLE 9

| Element | Spectr. 5 [wt %] | Spectr. 6 [wt %] | Spectr. 7 [wt %] | Spectr. 8 [wt %] | Spectr. 9 [wt %] | Spectr. 10 [wt %] |
|---|---|---|---|---|---|---|
| O | 1.48 | 0.67 | 1.20 | 0.99 | 2.34 | 0.91 |
| Si | 0.26 | 0.29 | — | 0.18 | — | 0.32 |
| P | 9.60 | 0.95 | 14.41 | 1.06 | 10.84 | 1.07 |
| Cr | 8.83 | 7.64 | 17.99 | 7.78 | 13.27 | 7.42 |
| Mn | 0.61 | — | 0.51 | — | 0.43 | — |
| Fe | 23.11 | 33.69 | 20.17 | 33.60 | 23.03 | 33.22 |
| Ni | 54.25 | 55.61 | 40.95 | 55.06 | 46.83 | 56.01 |
| Mo | 1.86 | 1.16 | 4.77 | 1.33 | 3.25 | 1.06 |
| Total | 100.00 | 100.00 | 100.00 | 100.00 | 100.00 | 100.00 |

The result in Table 9 shows that the joint mainly consists of NiP, and NiP has not alloyed properly with the parent materials 316 and SMO.

The analysed joint of test sample Ni—P plated 316 together with a layer of Si is shown in Table 10, see also FIG. 6. The thickness of NiP is 50 μm.

TABLE 10

| Element | Spectrum 11 [wt %] | Spectrum 12 [wt %] | Spectrum 13 [wt %] |
|---|---|---|---|
| C | 7.44 | 6.41 | 6.34 |
| O | 1.48 | 1.71 | 1.06 |
| Si | 2.22 | 1.99 | 2.43 |
| P | 5.76 | 8.83 | 0.48 |
| Cr | 11.13 | 12.33 | 9.47 |
| Mn | 0.39 | 0.51 | 0.00 |
| Fe | 30.33 | 26.57 | 38.80 |
| Ni | 38.70 | 38.19 | 40.10 |
| Mo | 2.54 | 3.46 | 1.33 |
| Total | 100.00 | 100.00 | 100.00 |

The results summarized in Table 10 show increased values of Fe in the joint, this means that the addition of Si supports the alloying process during the heating step. Thus the elements of the joint have increased similarity to the two parent materials which are joined.

Example 4

In Example 4 circular test pieces of type 316 stainless steel, diameter 42 mm were applied with $Mn_3P_2$. A pressed waffle of type 254 SMO were placed on top of the applied 316 test piece. The test pieces were heat treated for app 2 h in full vacuum at 1120° C. The results summarized in Table 11.

TABLE 11

| Element | Spectrum 2 [wt %] | Spectrum 3 [wt %] | Spectrum 4 [wt %] |
|---|---|---|---|
| C | 6.14 | 7.68 | 4.76 |
| O | 1.39 | 1.24 | 1.26 |
| Si | 2.22 | 3.17 | 2.72 |
| P | 2.03 | 2.13 | 0.978 |
| Cr | 18.51 | 20.23 | 16.44 |
| Mn | 1.52 | 1.63 | 2.04 |
| Fe | 48.37 | 42.97 | 53.22 |
| Ni | 48.37 | 42.97 | 53.22 |
| Mo | 6.36 | 11.55 | 3.05 |
| Total | 100.00 | 100.00 | 100.00 |

Table 11 shows that the created joint contains increased values of Fe origin from the parent materials.

Example 5

In Example 5 joining tests were performed. Pressed heat exchanger plates made of type 316 steel app 0.4 mm thick, and an area of app 190×70 mm, was applied on the top surface with $Mn_3P_2$ and Si as the phosphorous source and the silicon source, i.e. the melting point depressants (MPD).

BACKGROUND

The hypothesis was to have MPD on the surface, the MPD would diffuse is to the surface of the parent material creating an alloy. This alloy would then have a lower melting point then the parent material. If the composition of the alloy was right the alloy would both melt and flow by capillary forces to for example contact points between the pressed plates in the heat exchanger. To succeed the joints need to meet the following three criteria:
1) Substantial size and form of the materials to be joined, so that the joint can be loaded.

2) The composition of the joint should also be more similar to the parent material, therefore having mainly the properties of the parent material and not of the melting point depressants properties. The opposite is if the composition of the joint would be mainly formed by the applied material the method would instead be soldering or brazing, and therefore also mainly having the material applied properties.

3) The joint also needs to be wet onto the material to be joined with a contact angle less than 90°.

To obtain these three criteria the MPD needs to be dissolved and diffuse into the top layer of the plate without being consumed by reactions, evaporated or diffusion to rapidly into the base material so that no melt is formed. The alloy that is formed must have a viscosity that enables flowing of the melt at the joining temperature. The melt can only be formed if the amount of MPD is high enough in the parent material to create a melt at the joining temperature. The melt that is formed must have the properties to wet the material to be joined. The right amount and ration of the MPD must be applied.

Mixing and Applying of the Blend of MPD 102.56 gram of $Mn_3P_2$, type 99% pure powder—100 mesh from Advanced Chemicals and 33.92 g of Si gram of crystalline silicon powder particle size 325 mesh, 99.5% (metal basis) 7440-21-3 from Alfa Aesar—Johnsson Matthey Company was mixed together with 50.28 g of binder S20 gel from Wall Colmonoy, (Please observe that the $Mn_3P_2$ is a mixture of different forms of MnP).

The plates were taken from the pressing tool after pressing. The plates were not degreased or cleaned before applying the blend of MPD. The blend of MPD together with the binder was applied on the pressed plate's top surfaces by using a hand roller (normally used when painting). A quit large amount of filler was applied on each plate app 3-5 g/plate.

Heat Treatment Cycles

The heat treatment was carried out in a Hydrogen Furnace (HF), i.e. a Furnace cycle 1 in a belt furnace in hydrogen atmosphere. Bonding temperature app. 1115° C., belt speed 65 mm/min. Total length of the belt furnace approximately 5000 mm, meaning that the total time in the furnace was approximately 80 min.

Furnace cycle 2 was carried out in a Vacuum Furnace (VF), i.e. in a batch furnace in vacuum atmosphere. Bonding temperature approximately 1120° C. for approximately 1 h. The total time in the furnace was approximately 4 h.

Results

The bonded heat exchanger plates from each cycle was cut, ground, polished and then evaluated optically and by SEM-EDX (Scanning electron microscope with energy dispersive spectroscopy).

Optical Analysis

Figure 8:
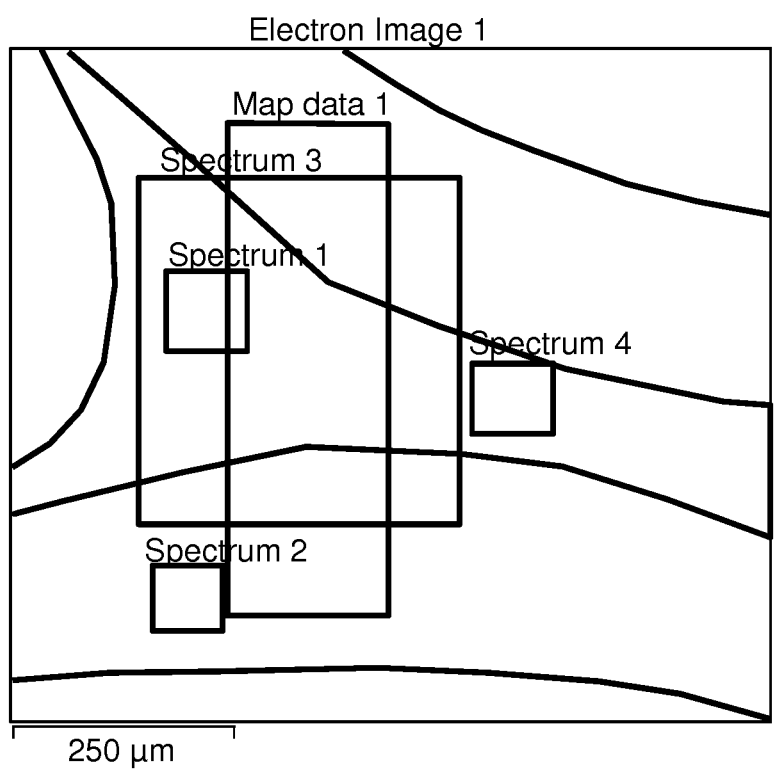
FIG. 8 is showing a cross-sectioned joint of sample bonded in the vacuum furnace analysed in SEM-EDX
Figure 9:
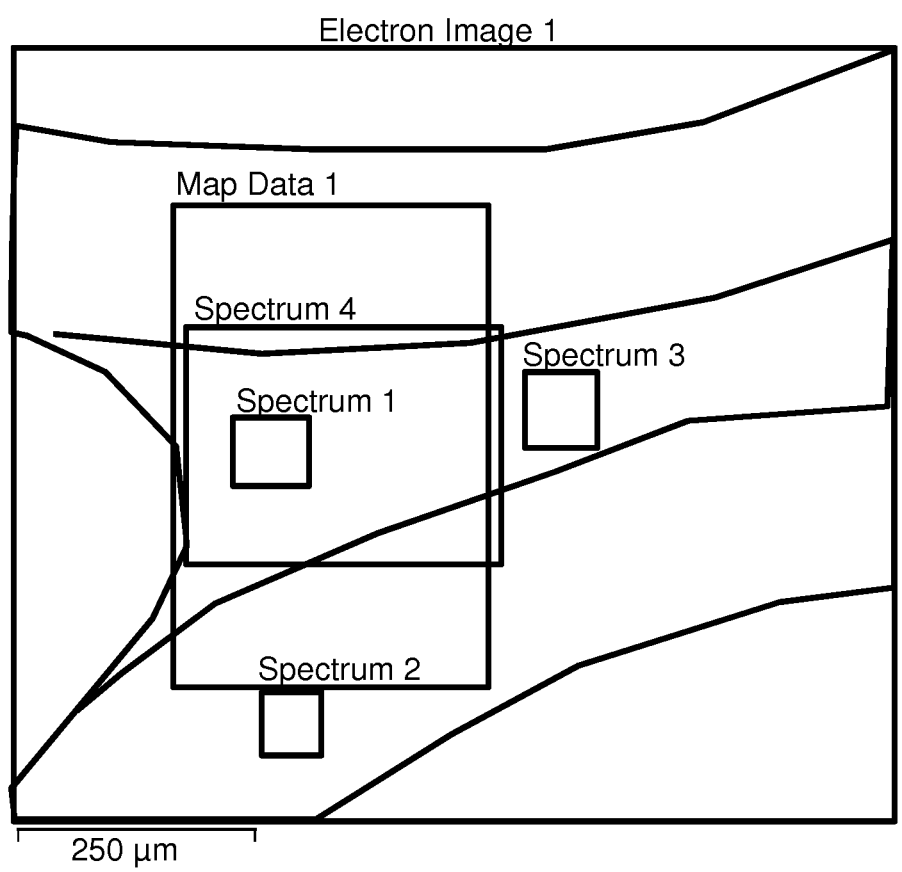
FIG. 9 is showing a cross-sectioned joint of sample bonded in the H2 atmosphere analysed in SEM-EDX

Large joints with a smooth surface was observed, this very beneficial for braze joints see FIG. 8 and FIG. 9. The formed alloy had wetted the other material that was joined and the wetting angle was less than 90°.

There were some holes in the plate that were bonded in the vacuum furnace indicating that a too large amount of MPD was applied on those spots, also indicating that a larger amount of melted phase was formed in the 4 h vacuum process than in the app 1 h hydrogen process.

SEM-EDX Analysis

The analyzed area for the sample joined in the vacuum cycle is shown in FIG. 8 and for the hydrogen atmosphere in FIG. 9. The analyzed results for the VF (vacuum furnace) is presented in Table 12 and for the HF (hydrogen furnace) in Table 13, all results are percent by weight % (wt %). Areas representing the pure joint, areas with both the joint and the parent material and the pure parent material are presented in the results.

TABLE 12

Table 12, SEM-EDX analysis of the compositions for a joint made in Vacuum Furnace.

| | Samples of VF | | | |
|---|---|---|---|---|
| Elements | Composition of the joint Spectrum 1 [wt %] | Composition of the joint Spectrum 3 [wt %] | Composition* app 80% of the joint and app 20% of the parent material Spectrum 4 [wt %] | Composition of the parent material Spectrum 2 [wt %] |
| Fe | 47.8 | 45.6 | 52.3 | 63.8 |
| Cr | 16.6 | 15.8 | 15.8 | 16.7 |
| Ni | 14.0 | 14.1 | 14.3 | 14.3 |
| Mn | 9.1 | 9.6 | 7.7 | 1.5 |
| P | 6.4 | 6.9 | 4.5 | 0.3 |
| Mo | 3.1 | 3.1 | 2.5 | 1.9 |
| Si | 3.0 | 2.8 | 2.9 | 0.7 |
| Other | — | 2.0 | — | 1.0 |
| Total | 100 | 100 | 100 | 100 |

*For some analyses a part of the parent material is also part of the analyzed result, this was estimated in form as wt %.

TABLE 13

Table 13, SEM-EDX analysis of the compositions for a joint made in Hydrogen Furnace.

| | Samples of HF | | | |
|---|---|---|---|---|
| Elements | Composition of the joint Spectrum 1 [wt %] | Composition of the joint Spectrum 3 [wt %] | Composition* app 80% of the joint and app 20% of the parent material Spectrum 4 [wt %] | Composition of the parent material Spectrum 2 [wt %] |
| Fe | 45.9 | 49.0 | 49.8 | 65.6 |
| Cr | 14.5 | 14.7 | 14.8 | 16.6 |
| Ni | 13.9 | 14.1 | 12.7 | 14.0 |
| Mn | 13.1 | 12.7 | 10.9 | 1.4 |
| P | 7.6 | 4.9 | 4.8 | — |
| Mo | 2.0 | 0.9 | 1.8 | 2.0 |
| Si | 3.0 | 3.7 | 3.5 | 0.5 |
| Other | — | — | 1.8 | — |
| Total | 100 | 100 | 100 | 100 |

*For some analyses a part of the parent material is also part of the analyzed result, this was estimated in form as wt %.

SUMMARY AND CONCLUSIONS

The investigation showed that it was possible to create a melted alloy of the parent material by using a $Mn_3P_2$ and Si as MPD on the plate surface. It was also shown that the composition of the formed alloy in the joint after cooling had a composition similar to the base material. It was also shown that the smooth and large joints were formed that had wetted the other surface with a contact angle less than 90°. It was also shown that it was possible to obtain the result in both a hydrogen atmosphere and under vacuum.

The invention claimed is:

1. A mechanical blend of powders for brazing, wherein each particle in the powder of the blend is either a phosphorous source particle or a silicon source particle, wherein silicon and phosphorous together are present in the blend in at least 30 wt %, wherein the at least one silicon source particle is selected from the group consisting of elemental silicon, ferro-silicon, silicon carbides, and silicon borides and the at least one phosphorous source particle is selected from the group consisting of manganese phosphides, nickel phosphides, potassium phosphides, reducible oxygen-containing phosphorus compounds, oxides of phosphorous, hypo-phosphoric acids, pyro-phosphoric acid, and ammonium salts of phosphorus compounds, and wherein the particles in the powder have an average particle size less than 250 μm;
wherein the blend further comprises powders of a parent material, wherein the parent material is present in an amount less than 75 wt % calculated on the total weight of silicon, phosphorous, and parent material; and wherein the blend has a lower melting point than the parent material.

2. A composition comprising a blend according to claim 1.

3. The composition according to claim 2, wherein the composition further comprises hard particles selected from particles based on oxides, nitrides, carbides, borides, or mixtures thereof, and wherein the hard particles have wear resistance properties.

4. The composition according to claim 2, wherein the composition further comprises powders of a parent material, wherein the parent material is present in an amount less than 75 wt % calculated on the total weight of silicon, phosphorous and parent material.

5. The composition according claim 2, wherein the composition further comprises at least one binder selected from solvents, water, oils, gels, lacquers, varnish, polymers, wax or combinations thereof.

6. The composition according claim 5, wherein the at least one binder is selected from polyesters, polyethylenes, polypropylenes, acrylic polymers, (meth)acrylic polymers, polyvinyl alcohols, polyvinyl acetates, polystyrenes, waxes, or combinations thereof.

7. The composition according to claim 2, wherein the composition is suitable for use as a plating bath.

8. A matrix layered product comprising a substrate and the composition according to claim 2, wherein the substrate is of a parent material which is selected from the group consisting of iron based alloys, nickel based alloys, chromium based alloys, cobalt based alloys, and copper based alloys having a melting point of at least 1000° C.

9. The matrix layered product according to claim 8, wherein the matrix layer is obtained by an electroless plating bath or by an electro plating bath.

10. A braze alloy layered product obtainable by heating a product according to claim 8 to a temperature of at least 900° C., and cooling the product to produce a product having a braze alloy layer on the substrate, wherein said obtained braze alloy layer has a melting point lower than the melting point of the substrate.

11. A coated product obtainable by heating a product according to claim 8 to a brazing temperature less than 1250° C., and cooling the product to produce a coated product, wherein the coated layer has similar melting point as the substrate.

12. The mechanical blend of powders for brazing according to claim 1, wherein silicon and phosphorous together are present in the blend in at least 35 wt %.

13. The mechanical blend of powders for brazing according to claim 1, wherein silicon and phosphorous together are present in the blend in at least 40 wt %.

14. The mechanical blend of powders for brazing according to claim 1, wherein silicon and phosphorous together are present in the blend in 100 wt %.

15. A composition, comprising:
the mechanical blend according to claim 14; and
at least one binder selected from solvents, water, oils, gels, lacquers, varnish, polymers, wax, or combinations thereof.

16. A method for providing a product having at least one brazed joint between contact areas between substrates, said method comprising the following steps:
applying the composition according to claim 2 on at least one substrate;
assembling the at least one substrate with at least one additional substrate, wherein the composition according to claim 2 is present in the contact areas;
heating the assembled substrates to a brazing temperature below 1250° C., in a furnace in vacuum, in an inert gas, in a reducing atmosphere, or combinations thereof; and
cooling the assembled substrates to obtain the product having at least one brazed joint between contact areas of the substrates.

17. A method for manufacturing a braze alloy layered product, which method comprises the following steps:
applying a composition according to claim 2 on one substrate;
heating the applied substrate to a temperature lower than the solidus temperature of the substrate to obtain a layer of molten phase of braze alloy; and
cooling the substrate having the molten phase of braze alloy to obtain a braze alloy layered product, wherein the temperature during heating further is higher than the solidus temperature of the obtained braze alloy.

18. The method according to claim 17, wherein the substrate comprises parent materials selected from parts or plates for heat exchangers, plate reactors, parts of reactors, parts of separators, parts of decanters, parts of pumps, or parts of valves.

* * * * *